Nov. 9, 1971  F. V. H. CHITTENDEN  3,618,418
BELT DRIVE
Filed Aug. 24, 1970  3 Sheets-Sheet 1

Nov. 9, 1971     F. V. H. CHITTENDEN     3,618,418

BELT DRIVE

Filed Aug. 24, 1970     3 Sheets-Sheet 3

United States Patent Office 3,618,418
Patented Nov. 9, 1971

3,618,418
BELT DRIVE
Frank Victor Henry Chittenden, Mountnessing, England, assignor to Ilford Limited, Ilford, England
Filed Aug. 24, 1970, Ser. No. 66,414
Int. Cl. F16h *1/04, 55/04;* F16g *1/28*
U.S. Cl. 74—422                7 Claims

ABSTRACT OF THE DISCLOSURE

This application describes an endless positive-drive toothed belt which is characterized in that it is composed of a flexible plastics material and has on at least one face a series of rack teeth, the belt being of such a degree of rigidity that, when used for transmitting drive as a moving rack from a driving pinion member to a driven pinion member, the length of the belt between driving and driven pinion members co-operating therewith maintains a path dictated by the physical characteristics of the belt and the location of the said members, which path is substantially unaffected by gravitational forces on the belt.

---

This invention relates to driving belts and to mechanical assemblies which comprise these driving belts.

In the usual toothed driving belt system the driving belt is under stretch tension between the driving member and the driven member and it is this tension which transmits the drive. Further because the belt has to be under tension there is usually only one driving member and one driven member.

It is the object of the present invention to provide a driving belt which does not require to be under tension when transmitting drive but which acts as a moving rack. Further it is the object of the present invention to provide a driving belt which is able to transmit drive from one driving member to a plurality of driven members.

According to the present invention there is provided an endless positive-drive toothed belt which is characterised in that it is composed of a flexible plastics material and has on at least one face a series of rack teeth, the belt being of such a degree of rigidity that when used for transmitting drive as a moving rack from a driving pinion member to a driven pinion member, the length of the belt between driving and driven pinion members co-operating therewith maintains a path dictated by the physical characteristics of the belt and the location of the said members, which path is substantially unaffected by gravitational forces on the belt.

Thus the endless positive drive belt of the present invention does not require to be under tension when transmitting drive. Further the endless positive-drive belt does not usually require (unless the driving loop is excessively long) to be supported at each end of the driving loop as long as means are provided for maintaining the belt in the driving position in relation to the driving member and to the driven member.

The series of teeth may be on the inside face of the belt or on the outside face of the belt or there may be a series of teeth on each face of the belt, in which case the teeth in the two series may be of similar size and/or shape or they may be different. Furthermore the teeth may be aligned opposite each other on both faces of the belt and this is the preferred arrangement. However one series of teeth may be offset compared to the other series on the other face of the belt.

The driving belt of the present invention acts as an endless moving rack. It is capable of transmitting drive from a single driving member to a comparatively large number of driven members. Further these driven members need not be located on the same face of the driving belt as the driving member. An arrangement of this type is shown in FIG. 1 of the accompanying drawings.

The flexible plastics material of which the belt is composed is preferably of high tensile strength and is comparatively dimensionally stable. The preferred plastics material is polypropylene. This material can be moulded in strip form with the desired shape of teeth on one or both faces of the strip, cut to the requisite length and the ends welded thus forming a belt or the material may be moulded in loop form initially. Wire reinforcement may be persent in the belt. Other suitable plastics materials are nylon and glass-fibre-reinforced nylon.

According to another embodiment of the present invention there is provided a toothed belt drive assembly which comprises in combination at least one driving member in the form of a spur wheel and at least one driven member in the form of a spur wheel, an endless positive drive toothed belt for transmitting drive from the driving member to the driven member, which belt is composed of a flexible plastics material, the belt having a series of teeth on at least one face thereof of a shape appropriate for use on a rack and which are adapted to engage with the teeth of the spur wheels of the driving member and the driven member, and means for maintaining the belt in driving relationship to the driving member and to the driven member.

In an alternative form of this aspect of the invention wherein the tooth shape of the spur wheel of the driving member is different to the tooth shape of the spur wheel of at least one driven member, the belt, of the type hereinbefore defined, has two series of teeth one on each face thereof, one of which series is adapted to engage with teeth of the spur wheel of the driving member and the other series with the teeth of the spur wheel of the driven member.

It is to be understood that such a drive assembly may include more than one driving member, such members driving at the same rate. Also there may be, and generally are, a plurality of driven members.

In some assemblies, depending on the length of the belt and on the path followed by the driving belt it is preferred that channel means are provided to guide the belt into the desired driving position. This is particularly important when the belt follows a sinuous path and the spur wheels are arranged as pairs one above the other, the belt passing between the pairs. In such assemblies it is preferred that channel means are provided such that the belt approaches the first pair of wheels in a direction which is tangential to both wheels in the region where the belt and wheels engage.

The accompanying drawings will serve to illustrate the invention.

Figure 1:
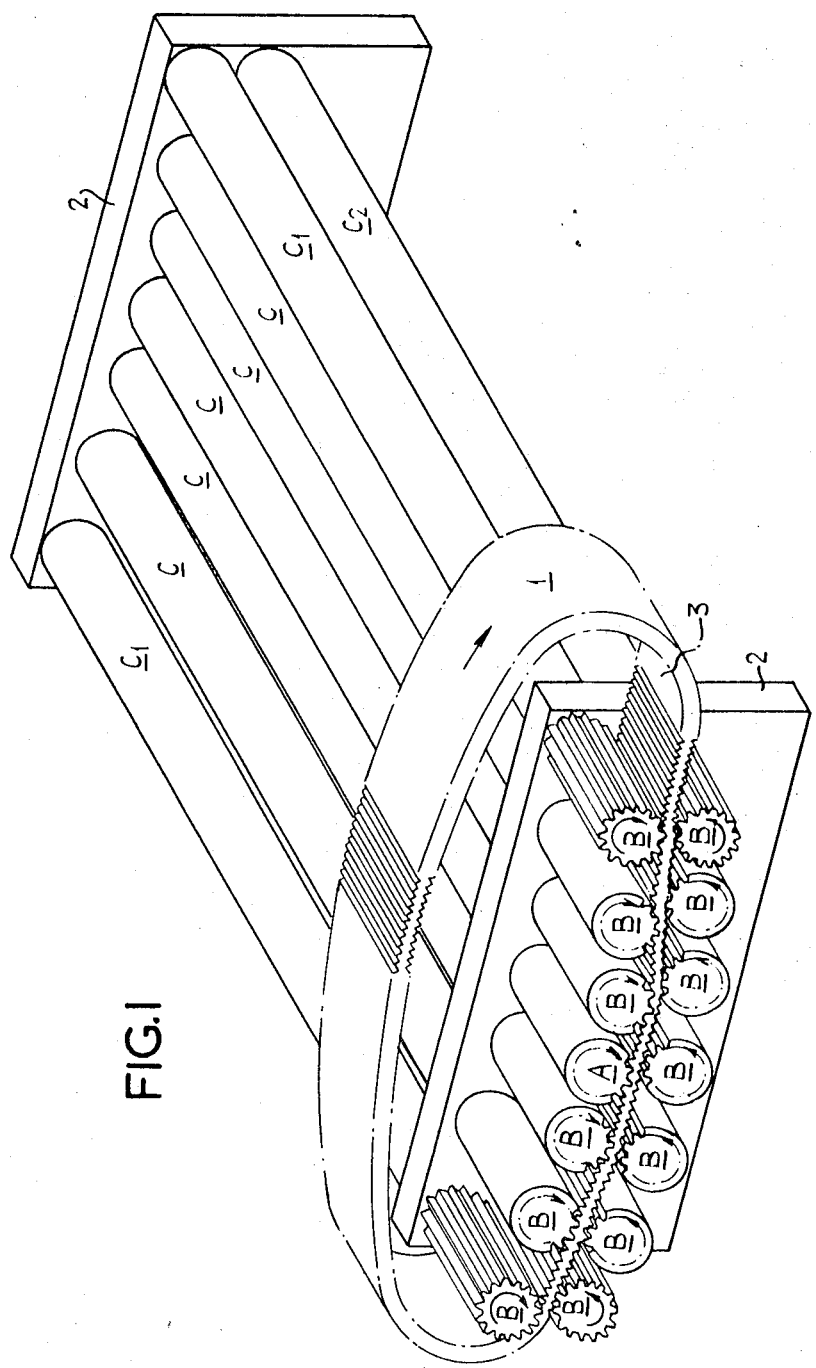
FIG. 1 is an isometric view of a toothed belt drive assembly according to the present invention showing a positive drive belt in position.

In FIG. 1 a toothed driving belt 1 engages with a driving spur wheel A (driving means not shown). The belt 1 engages also with thirteen driven spur wheels B. All the spur wheels A and B are connected to rollers C. The rollers C are supported at each end by end supports 2.

The belt 1 is composed of polypropylene. All the teeth on the belt, on either side thereof, are of the same profile, and of a shape appropriate for use on a rack and are adapted to engage with the teeth on all the spur wheels A and B.

The belt 1 is inserted into the array of spur wheels A and B and due to the disposition of these wheels further means for maintaining the belt in relationship to the driving spur wheel and the driven spur wheels is not required. It is to be noted that no support for the belt above the array of spur wheels is required. The length of the belt is so chosen that the loop in area 3 extends out horizontally from the array of spur wheels. If initially the loop of the belt is thus formed the belt will continue to approach the spur wheels horizontally, i.e. in a direction tangential to both wheels on the first pair of spur wheels in the region where the belt and wheels engage.

In operation the spur wheel A is caused to rotate in the direction indicated. This rotation causes the belt 1 to move forward in the direction indicated and this movement causes the spur wheels B to rotate in the directions indicated. Thus the belt 1 operates as a moving rack.

By use of the belt 1 it is possible to transmit the drive from one driving spur wheel A to thirteen driven spur wheels B without the need for any gear wheels or intermediate drive wheels between the spur wheels.

Figure 2:
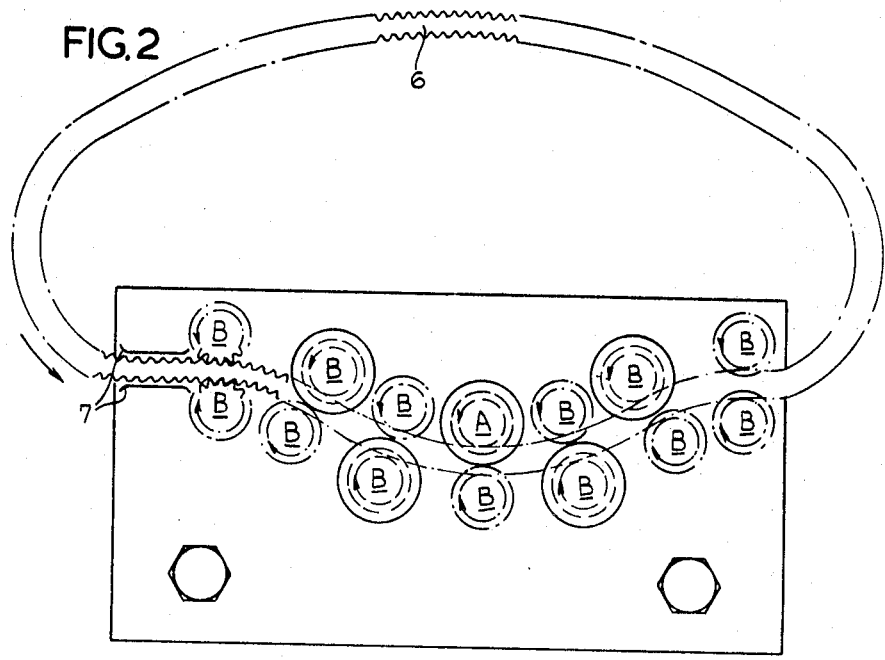
FIGS. 2–5 are all side elevations of toothed belt drive assemblies showing different arrangements of driving and driven members and the path followed by the driving belt.

In FIG. 2 is shown a similar toothed belt drive assembly. The belt 6 as the belt 1 in FIG. 1 is of polypropylene and all the teeth on the belt on either side thereof are of the same profile. A is (as in FIG. 1) the driving wheel and the wheels B are the driven wheels. The path of the belt 6 is more sinuous than the path of the belt in FIG. 1 and for this reason there is provided a channel 7 which serves to straighten the belt so that it approaches the first rollers B horizontally.

Figure 3:
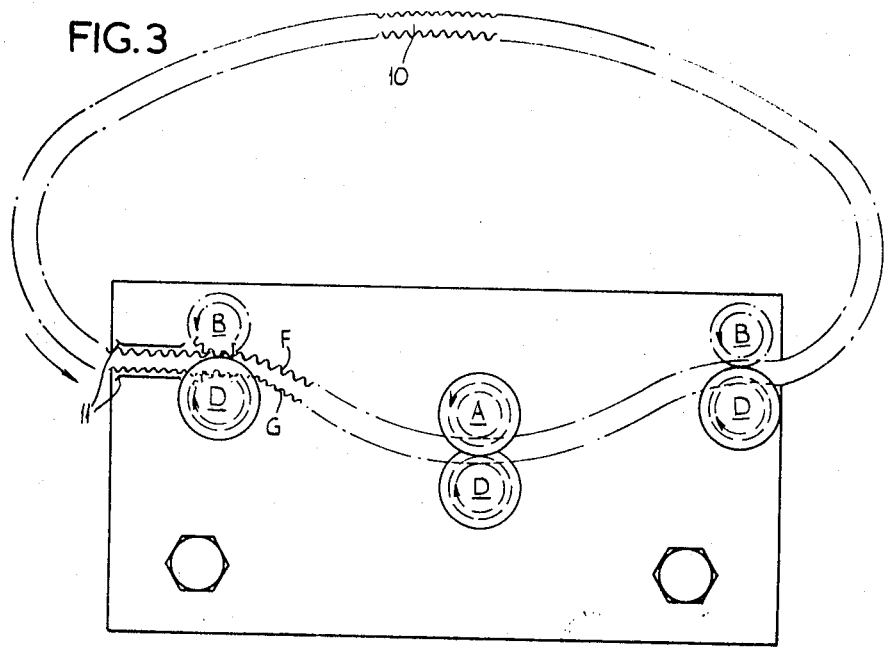

In FIG. 3 is shown another toothed belt drive assembly but the belt 10 which is of polypropylene has two series of teeth, the teeth on one face of the belt differing from the teeth on the other face of the belt. The profile of the teeth of the driving spur wheel A being similar in profile to the teeth on the driven rollers B and the teeth of face F are adapted to cooperate with the teeth on wheel A. The teeth on the face G of the belt are adapted to cooperate with the teeth on the driven spur wheels D. Channel 11 is provided to help in straightening out the belt before its teeth mesh with the first spur wheels in the sequence so that it approaches the first pair of spur wheels tangentially.

Figure 4:
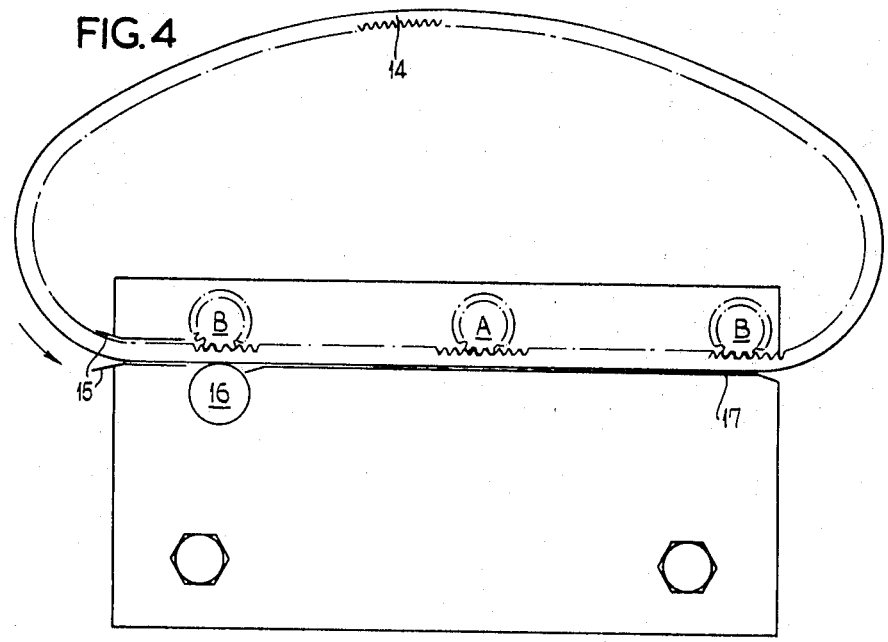

In FIG. 4 is shown a belt 14 having teeth on one face only. These teeth engage with a driving roller A and two driven rollers B. A channel 15 is provided which serves to straighten out the belt 14 before it reaches the first spur wheel B. Situated below the wheel B is a roller 16 which serves to keep the belt 14 in driving relationship with the roller B. A guide 17 below the belt 14 serves to keep the belt in driving relationship with the roller A and the other roller B.

Figure 5:
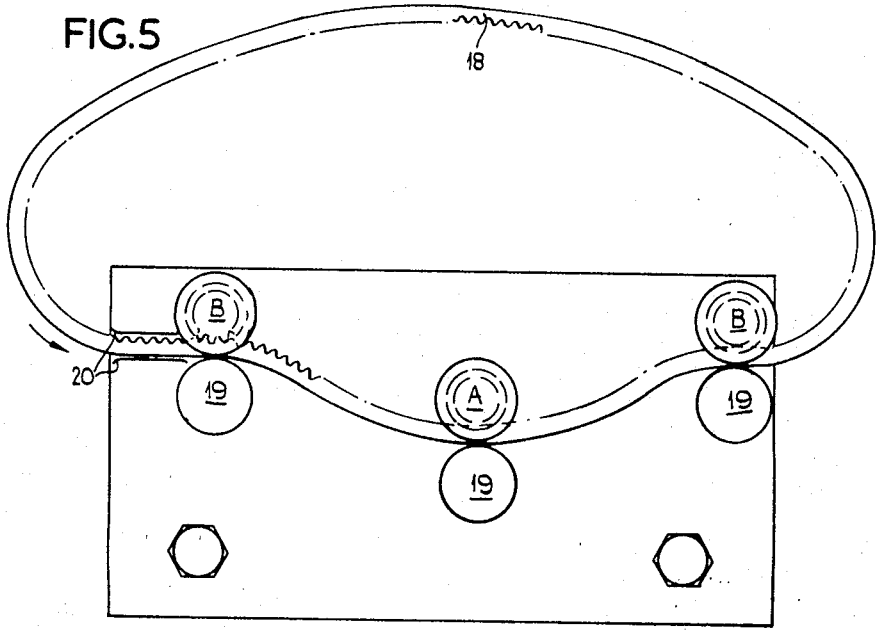

In FIG. 5 is shown a similar system to that of FIG. 4 but the belt 18 follows a more sinuous path and rollers 19 are provided under each of the rollers A and B. These serve to keep the belt in driving relationship with the spur wheels.

The toothed belt drive assembly of the present invention is of particular use in small conveyor systems wherein the spur wheels are attached to rollers as shown in FIG. 1. By means of such a roller system a flat article such as a sheet of paper or film when inserted between the rollers $C_1$ and $C_2$ in FIG. 1 may be conveyed through the roller system. All the rollers may be immersed in liquid and thus the conveyor system may be part of a processor such as a photographic processor in which case the liquid may be a developing or fixing solution or a wash bath.

I claim:

1. An endless positive-drive toothed belt which is characterised in that it is composed of a flexible plastics material and has on at least one face a series of rack teeth, the belt being of such a degree of rigidity that, when used for transmitting drive as a moving rack from a driving pinion member to a driven pinion member, the length of the belt between driving and driven pinion members co-operating therewith maintains a path dictated by the physical characteristics of the belt and the location of the said members, which path is substantially unaffected by gravitational forces on the belt.

2. An endless positive-drive toothed belt according to claim 1 wherein there is a series of teeth on each face of the belt.

3. An endless positive-drive toothed belt according to claim 2 wherein the two series of teeth are of similar shape.

4. An endless positive-drive toothed belt according to claim 2 wherein the teeth of the two series are aligned opposite each other on opposite sides of the belt.

5. An endless positive-drive toothed belt according to claim 1 wherein the belt is composed of polypropylene.

6. A toothed belt drive assembly which comprises in combination at least one driving pinion member in the form of a spur wheel and at least one driven pinion member in the form of a spur wheel and which is characterised in that it comprises an endless positive-drive toothed belt which is composed of a flexible plastics material and has on at least one face a series of rack teeth, the belt being of such a degree of rigidity that, when used for transmitting drive as a moving rack from the driving pinion member to the driven pinion member, the length of the belt between driving and driven pinion members co-operating therewith maintains a path dictated by the physical characteristics of the belt and the location of said members which path is substantially unaffected by gravitational forces on the belt, the shape of the rack teeth on the said belt being adapted to engage with the teeth of the spur wheels of the driving member and the driven member, and there being present means for maintaining the belt in driving relationship with the driving member and with the driven member.

7. A toothed belt drive assembly which comprises in combination at least one driving pinion member in the form of a spur wheel and at least one driven pinion member in the form of a spur wheel the teeth of which are of a different shape to the teeth of the spur wheel of the driving member, which toothed belt drive assembly is characterised in that it comprises an endless positive-drive toothed belt which is composed of a flexible plastics material and has on one face a series of rack teeth which are adapted to engage with the teeth on the spur wheel of the driving member and which has on the other face a series of rack teeth which are adapted to engage with the teeth on the spur wheel of the driven member, the belt being of such a degree of rigidity that, when used for transmitting drive as a moving rack from the driving pinion member to the driven pinion member, the length of the belt between the driving and driven pinion members co-operating therewith maintains a path dictated by the physical characteristics of the belt and the location of said members which path is substantially unaffected by gravitational forces on the belt, and there being present means for maintaining the belt in driving relationship with the driving member and with the driven member.

References Cited

UNITED STATES PATENTS

| | | | |
|---|---|---|---|
| 627,491 | 6/1899 | Evans | 74—192 |
| 2,217,037 | 10/1940 | Abramoska | 74—722 X |
| 2,831,359 | 4/1958 | Carle | 74—233 |
| 3,059,489 | 10/1962 | Gourley | 74—422 X |
| 3,338,107 | 8/1967 | Kiekhaefer | 74—231 C |

LEONARD H. GERIN, Primary Examiner

U.S. Cl. X.R.

74—231 C, 438, 722